United States Patent
Zhang et al.

(10) Patent No.: US 12,515,988 B2
(45) Date of Patent: Jan. 6, 2026

(54) SECONDARY ALUMINUM ASH FOR CONCRETE AND TREATMENT METHOD THEREOF

(71) Applicant: Guangdong Zhidao Advanced Civil Engineering Materials Technology Research Co., Ltd., Guangdong (CN)

(72) Inventors: Dakang Zhang, Guangdong (CN); Wenhui Kuang, Guangdong (CN); Yulu Zhang, Guangdong (CN); Junli Zhao, Guangdong (CN); Siyi Wang, Guangdong (CN)

(73) Assignee: Guangdong Zhidao Advanced Civil Engineering Materials Technology Research Co., Ltd., Foshan (CN)

( * ) Notice: Subject to any disclaimer, the term of this patent is extended or adjusted under 35 U.S.C. 154(b) by 372 days.

(21) Appl. No.: 18/127,108

(22) Filed: Mar. 28, 2023

(65) Prior Publication Data
US 2024/0002291 A1 Jan. 4, 2024

(30) Foreign Application Priority Data
Jun. 29, 2022 (CN) .......................... 202210750673.3

(51) Int. Cl.
*C04B 18/08* (2006.01)
*C04B 20/00* (2006.01)
*C04B 20/02* (2006.01)
*C04B 20/06* (2006.01)

(52) U.S. Cl.
CPC ............ *C04B 18/08* (2013.01); *C04B 20/008* (2013.01); *C04B 20/023* (2013.01); *C04B 20/026* (2013.01); *C04B 20/068* (2013.01)

(58) Field of Classification Search
CPC ..... C04B 18/08; C04B 20/023; C04B 20/008; C04B 20/026; C04B 20/068; C04B 18/0481; C04B 18/149; C04B 28/02; C04B 40/0039; C04B 7/06
See application file for complete search history.

(56) References Cited

U.S. PATENT DOCUMENTS

2022/0064063 A1* 3/2022 Chiang ................ B01J 19/0033

FOREIGN PATENT DOCUMENTS

| CN | 114622092 A | 6/2022 |
|----|-------------|--------|
| CN | 114671636 A | 6/2022 |

OTHER PUBLICATIONS

Translation of CN 110218837 (Year: 2019).*
Translation of CN 112570419 (Year: 2021).*

* cited by examiner

Primary Examiner — Zakiya W Bates

(57) ABSTRACT

A treatment method of secondary aluminum ash for concrete and the secondary aluminum ash for concrete are provided. The treatment method includes the following steps: (1) grinding the secondary aluminum ash to obtain ground secondary aluminum ash; (2) subjecting the ground secondary aluminum ash to deoxidation; (3) mixing deoxidized secondary aluminum ash with an alkali liquor, and conducting a reaction at 80° C. to 100° C. for 3 h to 10 h to obtain an intermediate system; and (4) adding calcium hydroxide and sodium hydroxide to the intermediate system, conducting a reaction at 100° C. to 200° C. and 0.1 MPa to 1.55 MPa for 2 h to 4 h, conducting solid-liquid separation, and washing a resulting solid to obtain the finished secondary aluminum ash product for concrete.

10 Claims, No Drawings

SECONDARY ALUMINUM ASH FOR CONCRETE AND TREATMENT METHOD THEREOF

CROSS-REFERENCE TO RELATED APPLICATION

The present application claims priority from Chinese Patent Application No. 202210750673.3 filed on Jun. 29, 2022, the contents of which are incorporated herein by reference in their entirety.

TECHNICAL FIELD

The present disclosure relates to the technical field of concrete, and in particular to secondary aluminum ash for concrete and a treatment method thereof.

BACKGROUND

Secondary aluminum ash is hazardous solid waste produced in the aluminum industry. Main components of secondary aluminum ash are elemental aluminum, aluminum oxide, and aluminum nitride, and secondary aluminum ash further includes some salts (fluoride salts, chloride salts, or the like) and silicon dioxide. Secondary aluminum ash can react with water or moisture in humid air to produce toxic, harmful, flammable, and malodorous gases, such as $NH_3$, $CH_4$, $PH_3$, $H_2$, and $H_2S$. Therefore, it is necessary to treat secondary aluminum ash.

At present, secondary aluminum ash is commonly treated by a hydrolysis method, that is, secondary aluminum ash is mixed with a liquid medium (water, alkali liquor, or the like) to allow a chemical reaction, such that aluminum nitride and elemental aluminum and compounds thereof are hydrolyzed to mainly obtain a meta aluminate and a filter residue. However, a waste residue of this hydrolysis method can hardly be used in the field of concrete, which is mainly due to the following reasons: 1. In the existing treatment process for secondary aluminum ash, aluminum nitride, elemental aluminum, or the like cannot completely treated, and in the alkaline environment of concrete, the residual aluminum nitride and elemental aluminum will further undergo hydrolysis to produce a large amount of ammonia and hydrogen, such that the concrete undergoes volume expansion and strength reduction. In particular, the inventors discover through research that some aluminum elements are often coated with an aluminum oxide layer, which makes the aluminum elements unable to undergo a reaction during conventional treatment. During a hydration process of concrete, aluminum oxide will react with a cementing material and destroy a coating structure, such that an aluminum element coated with aluminum oxide reacts with water to produce hydrogen, thereby destroying a structure of the concrete and reducing a strength of the concrete. Specifically, when secondary aluminum ash treated with the existing secondary aluminum ash treatment process without complete hydrolysis is used to replace 5% of cement, a strength of resulting cement is reduced by about 67%; and when the secondary aluminum ash is used to replace 15% of cement, a strength of resulting cement is only 13% of a strength of pure cement. 2. The existing treatment process is difficult to effectively remove salts in secondary aluminum ash, and thus when secondary aluminum ash treated by the process is used in concrete, the concrete has a too-high Cl content and corrodes a steel structure.

SUMMARY

A first technical problem to be solved by the present disclosure is to provide a treatment method of secondary aluminum ash for concrete, which can effectively increase a doping amount of secondary aluminum ash in concrete.

A second technical problem to be solved by the present disclosure is to provide secondary aluminum ash for concrete.

A third technical problem to be solved by the present disclosure is to provide concrete.

In order to solve the above technical problems, the present disclosure provides a treatment method of secondary aluminum ash for concrete, including the following steps:

(1) grinding the secondary aluminum ash to obtain ground secondary aluminum ash that has a sieve residue of lower than or equal to 30 wt % when sieved through a 45 μm sieve;

(2) subjecting the ground secondary aluminum ash to deoxidation;

(3) mixing deoxidized secondary aluminum ash with an alkali liquor according to a weight ratio of 1:(3-10), and conducting hydrolysis at 80° C. to 100° C. for 3 h to 10 h to obtain an intermediate system; and (4) adding calcium hydroxide and sodium hydroxide to the intermediate system, conducting hydrolysis at 100° C. to 200° C. and 0.1 MPa to 1.55 MPa for 2 h to 4 h, conducting solid-liquid separation (SLS), and washing a resulting solid to obtain the finished secondary aluminum ash product for concrete, where in step (4), an amount of the calcium hydroxide added is 2 wt % to 20 wt % of an amount of the deoxidized secondary aluminum ash and an amount of the sodium hydroxide added is 1 wt % to 5 wt % of the amount of the deoxidized secondary aluminum ash.

As an improvement of the above technical solution, in step (1), the ground secondary aluminum ash has particle size distribution parameters satisfying the following condition: $(D90-D10)/(D50-D10) \leq 2$.

As an improvement of the above technical solution, in step (1), a grinding aid is added at an amount 0.01 wt % to 0.1 wt % of a weight of the secondary aluminum ash; and the grinding aid includes the following components in weight percentage: ethylene glycol (EG): 20% to 30%, sodium stearate: 10% to 20%, diethylene glycol (DEG): 10% to 50%, and water: 10% to 60%.

As an improvement of the above technical solution, step (2) includes: mixing the ground secondary aluminum ash with water according to a weight ratio of 1:(2-10), stirring a resulting mixture at 60° C. to 90° C. to allow a reaction for 1 min to 30 min, and conducting SLS to obtain the deoxidized secondary aluminum ash.

As an improvement of the above technical solution, in step (2), a weight ratio of the ground secondary aluminum ash to the water is 1:(3-6), and the reaction is conducted at 80° C. to 90° C. for 10 min to 20 min.

As an improvement of the above technical solution, in step (2), an ultrasonic transducer is provided in a device for the reaction to subject the ground secondary aluminum ash and the water to an ultrasonic treatment.

As an improvement of the above technical solution, in step (3), the alkali liquor is a sodium hydroxide aqueous solution with a concentration of 1 g/L to 50 g/L.

As an improvement of the above technical solution, in step (4), the amount of the calcium hydroxide added is 12 wt % to 20 wt % of the amount of the deoxidized secondary aluminum ash, and the reaction is conducted at 150° C. to 200° C. and 1 MPa to 1.2 MPa for 2.5 h to 3.5 h.

Accordingly, the present disclosure also discloses secondary aluminum ash for concrete obtained by the treatment method described above.

Accordingly, the present disclosure also discloses concrete including the secondary aluminum ash described above in a content of 5 wt % to 20 wt %.

The implementation of the present disclosure has the following beneficial effects:

1. In the treatment method of secondary aluminum ash for concrete provided by the present disclosure, a coating structure is first effectively broken by grinding, such that an aluminum element is easy to contact and react with sodium hydroxide, thereby realizing the removal of harmful media in the secondary aluminum ash; and high-temperature and high-pressure conditions are adopted at a hydrolysis stage to make a hydrolysis reaction thorough. Through the combination of the above two means, contents of harmful substances such as aluminum nitride and elemental aluminum in treated secondary aluminum ash are extremely low, and the treated secondary aluminum ash will not lead to the generation of a gas under the alkaline conditions of concrete, which enables the doping of secondary aluminum ash in concrete at a high amount.

2. In the treatment method of secondary aluminum ash for concrete provided by the present disclosure, a specific grinding aid is introduced to control a particle size of ground secondary aluminum ash in a specific range, such that a coating structure is fully broken. In addition, a reaction is allowed with 80° C. to 90° C. water at a deoxidation stage to effectively remove salts in the secondary aluminum ash, which prevents concrete from having a too-high Cl content and corroding a steel structure.

DETAILED DESCRIPTION

To make the objectives, technical solutions, and advantages of the present disclosure clearer, the present disclosure will be further described in detail below in combination with specific embodiments.

The present disclosure discloses a treatment method of secondary aluminum ash for concrete, including the following steps:

S1: The secondary aluminum ash is ground to obtain ground secondary aluminum ash that has a sieve residue of lower than or equal to 30 wt % when sieved through a 45 μm sieve.

Specifically, the secondary aluminum ash is ground in a ball mill or vertical mill to obtain the ground secondary aluminum ash that has a sieve residue of lower than or equal to 30 wt % when sieved through a 45 μm sieve. The grinding can effectively destroy the coating of an aluminum oxide layer to the aluminum element, such that the subsequent hydrolysis is accelerated and the hydrolysis degree is increased.

Preferably, in an embodiment of the present disclosure, a grinding aid is added during the grinding, and an amount of the grinding aid is 0.01 wt % to 0.1 wt % of the secondary aluminum ash, such as 0.02 wt %, 0.03 wt %, 0.05 wt %, 0.07 wt %, and 0.09 wt %. The introduction of the grinding aid can reduce the energy consumption of grinding and optimize a particle size distribution of ground secondary aluminum ash. Specifically, the grinding aid can be a common grinding aid in the cement field, but is not limited thereto.

Preferably, in an embodiment of the present disclosure, the grinding aid includes the following components in weight percentage: EG: 20% to 30%, sodium stearate: 10% to 20%, DEG: 10% to 50%, and water: 10% to 60%. By adding the grinding aid based on the above composition, particle size distribution parameters of the ground secondary aluminum ash satisfies the following condition: $(D90-D10)/(D50-D10) \leq 2$, which can not only improve the hydrolysis rate and hydrolysis degree, but also cooperate with the subsequent deoxidation process to effectively remove the salts in the secondary aluminum ash. In the formula, D10, D50, and D90 represent particle sizes corresponding to 10%, 50%, and 90% of particles in a particle size distribution curve, respectively, and the particle size distribution curve can be determined by a laser particle size analyzer.

S2: The ground secondary aluminum ash is subjected to deoxidation.

Specifically, the deoxidation refers to the replacement of air (oxygen) in the secondary aluminum ash to prevent explosion caused by a combustible gas generated during later hydrolysis. The deoxidation can be conducted as follows: an inert gas (such as nitrogen and argon) is introduced to replace the air, but the present disclosure is not limited thereto.

Preferably, in an embodiment of the present disclosure, the ground secondary aluminum ash is mixed with water according to a weight ratio of 1:(2-10), and a resulting mixture is stirred at 60° C. to 90° C. to allow a reaction for 1 min to 30 min and then subjected to SLS to obtain deoxidized secondary aluminum ash. The above process can not only effectively achieve the deoxidation, but also effectively remove salts in the secondary aluminum ash. Further preferably, a weight ratio of the ground secondary aluminum ash to the water is 1:(3-6), and the reaction is conducted at 80° C. to 90° C. for 10 min to 20 min. The above conditions can greatly improve a removal rate of the salts.

In addition, in order to further improve the removal efficiency of the salts, an ultrasonic transducer is provided in a reaction device for deoxidation to subject the ground secondary aluminum ash and the water to an ultrasonic treatment.

S3: The deoxidized secondary aluminum ash is mixed with an alkali liquor according to a weight ratio of 1:(3-10), and a reaction is conducted at 80° C. to 100° C. for 3 h to 10 h to obtain an intermediate system.

Specifically, the alkali liquor is a sodium hydroxide aqueous solution or a potassium hydroxide aqueous solution, but the present disclosure is not limited thereto. Preferably, the alkali liquor is a sodium hydroxide solution with a concentration of 1 g/L to 50 g/L.

S4: Calcium hydroxide and sodium hydroxide are added to the intermediate system, a reaction is conducted at 100° C. to 200° C. and 0.1 MPa to 1.55 MPa for 2 h to 4 h, a resulting reaction system is subjected to SLS, and a resulting solid is washed to obtain the finished secondary aluminum ash product for concrete.

Specifically, an amount of the calcium hydroxide is 2 wt % to 20 wt % of an amount of the deoxidized secondary aluminum ash and an amount of the sodium hydroxide is 1 wt % to 5 wt % of the amount of the deoxidized secondary aluminum ash. Preferably, the amount of the calcium hydroxide is 12 wt % to 20 wt % of the amount of the deoxidized secondary aluminum ash, and the reaction is conducted at 150° C. to 200° C. and 1 MPa to 1.2 MPa for 2.5 h to 3.5 h. The above hydrolysis reaction at a high temperature and a high pressure can improve a decomposition degree of harmful substances. In addition, the introduction of calcium hydroxide can also immobilize a part of the aluminum oxide and aluminum element in the secondary aluminum ash in the form of calcium aluminate into a solid phase product obtained after the reaction, and thus the treated secondary aluminum ash can be used in concrete, which improves a utilization rate of secondary aluminum ash.

Accordingly, the present disclosure also discloses concrete including the secondary aluminum ash treated by the treatment method described above in a content of 5 wt % to 20 wt %. Specifically, the secondary aluminum ash treated by the treatment method of the present disclosure can replace 5% to 20% of cement without affecting the mechanical performance and durability of concrete.

The present disclosure is further described below with reference to specific examples.

Example 1 Treatment Method of Secondary Aluminum Ash

A method for preparing modified secondary aluminum ash and an alkali activator was provided in this example, specifically including:
(1) The secondary aluminum ash was ground to obtain ground secondary aluminum ash that had a sieve residue of 20.2 wt % when sieved through a 45 μm sieve.
   Specifically, the secondary aluminum ash was added to a ball mill and ground without the addition of a grinding aid to obtain ground secondary aluminum ash, which had D90 of 63.54 μm, D50 of 38.55 μm, and D10 of 15.66 μm.
(2) The ground secondary aluminum ash was subjected to deoxidation.
   Specifically, the ground secondary aluminum ash was placed in a reactor, and then nitrogen was introduced for replacement.
(3) The deoxidized secondary aluminum ash was mixed with a 10 g/L sodium hydroxide solution according to a weight ratio of 1:10, and a reaction was conducted at 80° C. for 8 h to obtain an intermediate system.
(4) Calcium hydroxide and sodium hydroxide were added to the intermediate system, a reaction was conducted at 190° C. and 0.5 MPa for 4 h, a resulting reaction system was subjected to SLS, and a resulting solid was washed to obtain a finished secondary aluminum ash product for concrete.

An amount of the calcium hydroxide was 20 wt % of an amount of the deoxidized secondary aluminum ash and an amount of the sodium hydroxide was 2 wt % of the amount of the deoxidized secondary aluminum ash.

Example 2 Treatment Method of Secondary Aluminum Ash

A method for preparing modified secondary aluminum ash and an alkali activator was provided in this example, specifically including:
(1) The secondary aluminum ash was ground to obtain ground secondary aluminum ash that had a sieve residue of 20.2 wt % when sieved through a 45 μm sieve.
   Specifically, the secondary aluminum ash was added to a ball mill and ground without the addition of a grinding aid to obtain ground secondary aluminum ash, which had D90 of 63.54 μm, D50 of 38.55 μm, and D10 of 15.66 μm.
(2) The ground secondary aluminum ash was subjected to deoxidation.
   Specifically, the ground secondary aluminum ash was mixed with water according to a weight ratio of 1:8, and a resulting mixture was stirred at 70° C. to allow a reaction for 5 min and then subjected to SLS to obtain deoxidized secondary aluminum ash.
(3) The deoxidized secondary aluminum ash was mixed with a 10 g/L sodium hydroxide solution according to a weight ratio of 1:10, and a reaction was conducted at 80° C. for 8 h to obtain an intermediate system.
(4) Calcium hydroxide and sodium hydroxide were added to the intermediate system, a reaction was conducted at 190° C. and 0.5 MPa for 4 h, a resulting reaction system was subjected to SLS, and a resulting solid was washed to obtain a finished secondary aluminum ash product for concrete.

An amount of the calcium hydroxide was 20 wt % of an amount of the deoxidized secondary aluminum ash and an amount of the sodium hydroxide was 2 wt % of the amount of the deoxidized secondary aluminum ash.

Example 3 Treatment Method of Secondary Aluminum Ash

A method for preparing modified secondary aluminum ash and an alkali activator was provided in this example, specifically including:
(1) The secondary aluminum ash was ground to obtain ground secondary aluminum ash that had a sieve residue of 20.2 wt % when sieved through a 45 μm sieve.
   Specifically, the secondary aluminum ash was added to a ball mill and ground without the addition of a grinding aid to obtain ground secondary aluminum ash, which had D90 of 63.54 μm, D50 of 38.55 μm, and D10 of 15.66 μm.
(2) The ground secondary aluminum ash was subjected to deoxidation.
   Specifically, the ground secondary aluminum ash was mixed with water according to a weight ratio of 1:5, and a resulting mixture was stirred at 85° C. to allow a reaction for 15 min and then subjected to SLS to obtain deoxidized secondary aluminum ash.
(3) The deoxidized secondary aluminum ash was mixed with a 10 g/L sodium hydroxide solution according to a weight ratio of 1:10, and a reaction was conducted at 80° C. for 8 h to obtain an intermediate system.
(4) Calcium hydroxide and sodium hydroxide were added to the intermediate system, a reaction was conducted at 190° C. and 0.5 MPa for 4 h, a resulting reaction system was subjected to SLS, and a resulting solid was washed to obtain a finished secondary aluminum ash product for concrete.

An amount of the calcium hydroxide was 20 wt % of an amount of the deoxidized secondary aluminum ash and an amount of the sodium hydroxide was 2 wt % of the amount of the deoxidized secondary aluminum ash.

Example 4 Treatment Method of Secondary Aluminum Ash

A method for preparing modified secondary aluminum ash and an alkali activator was provided in this example, specifically including:
(1) The secondary aluminum ash was ground to obtain ground secondary aluminum ash that had a sieve residue of 15.6 wt % when sieved through a 45 μm sieve.

Specifically, the secondary aluminum ash was added to a ball mill, 0.05 wt % of a grinding aid was added, and the secondary aluminum ash was ground to obtain ground secondary aluminum ash, which had D90 of 58.32 µm, D50 of 35.55 µm, D10 of 11.55 µm, and a sieve residue of 15.6 wt % when sieved through a 45 µm sieve.

The grinding aid had the following formula:

EG: 24.5%, sodium stearate: 12.5%, DEG: 34.2%, and water: 28.8%.

(2) The ground secondary aluminum ash was subjected to deoxidation.

Specifically, the ground secondary aluminum ash was mixed with water according to a weight ratio of 1:5, and a resulting mixture was stirred at 85° C. to allow a reaction for 15 min and then subjected to SLS to obtain deoxidized secondary aluminum ash.

(3) The deoxidized secondary aluminum ash was mixed with a 10 g/L sodium hydroxide solution according to a weight ratio of 1:10, and a reaction was conducted at 80° C. for 8 h to obtain an intermediate system.

(4) Calcium hydroxide and sodium hydroxide were added to the intermediate system, a reaction was conducted at 190° C. and 0.5 MPa for 4 h, a resulting reaction system was subjected to SLS, and a resulting solid was washed to obtain a finished secondary aluminum ash product for concrete.

An amount of the calcium hydroxide was 20 wt % of an amount of the deoxidized secondary aluminum ash and an amount of the sodium hydroxide was 2 wt % of the amount of the deoxidized secondary aluminum ash.

Example 5 Treatment Method of Secondary Aluminum Ash

A method for preparing modified secondary aluminum ash and an alkali activator was provided in this example, specifically including:

(1) The secondary aluminum ash was ground to obtain ground secondary aluminum ash that had a sieve residue of 15.6 wt % when sieved through a 45 µm sieve.

Specifically, the secondary aluminum ash was added to a ball mill, 0.05 wt % of a grinding aid was added, and the secondary aluminum ash was ground to obtain ground secondary aluminum ash, which had D90 of 58.32 µm, D50 of 35.55 µm, D10 of 11.55 µm, and a sieve residue of 15.6 wt % when sieved through a 45 µm sieve.

The grinding aid had the following formula:

EG: 24.5%, sodium stearate: 12.5%, DEG: 34.2%, and water: 28.8%.

(2) The ground secondary aluminum ash was subjected to deoxidation.

Specifically, the ground secondary aluminum ash was mixed with water according to a weight ratio of 1:5, and a resulting mixture was stirred at 85° C. to allow a reaction for 15 min and then subjected to SLS to obtain deoxidized secondary aluminum ash. An ultrasonic treatment was conducted during the deoxidation.

(3) The deoxidized secondary aluminum ash was mixed with a 10 g/L sodium hydroxide solution according to a weight ratio of 1:10, and a reaction was conducted at 80° C. for 8 h to obtain an intermediate system.

(4) Calcium hydroxide and sodium hydroxide were added to the intermediate system, a reaction was conducted at 190° C. and 0.5 MPa for 4 h, a resulting reaction system was subjected to SLS, and a resulting solid was washed to obtain a finished secondary aluminum ash product for concrete.

An amount of the calcium hydroxide was 20 wt % of an amount of the deoxidized secondary aluminum ash and an amount of the sodium hydroxide was 2 wt % of the amount of the deoxidized secondary aluminum ash.

Test Example 1 Concrete

Concrete was provided in this example, with a formula as follows:

cement: 220 kg/m 3, secondary aluminum ash: 11 kg/m 3, slag powder: 80 kg/m 3, fine aggregate: 880 kg/m 3, coarse aggregate: 1,040 kg/m 3, water-reducing agent: 8 kg/m 3, and water: 155 kg/m 3. Specifically, the finished secondary aluminum ash products obtained in Examples 1 to 5 each were used to prepare concrete.

Test Example 2 cement: 195 kg/m 3, secondary aluminum ash: 35 kg/m 3, slag powder: 80 kg/m 3, fine aggregate: 880 kg/m 3, coarse aggregate: 1,040 kg/m 3, water-reducing agent: 8 kg/m 3, and water: 155 kg/m 3.

Specifically, the finished secondary aluminum ash products obtained in Examples 1 to 5 each were used to prepare concrete.

Comparative Example 1

Concrete was provided in this comparative example, which was different from Test Example 1 in that a different treatment process was adopted for secondary aluminum ash, specifically including:

(1) Secondary aluminum ash was provided. A particle size distribution of the secondary aluminum ash was as follows: D90=76.47 µm, D50=40.42 µm, D10=23.44 µm, and sieve residue of a 45 µm sieve: 45.4 wt %.

(2) The secondary aluminum ash was subjected to deoxidation.

Specifically, the ground secondary aluminum ash was placed in a reactor, and then nitrogen was introduced for replacement.

(3) The deoxidized secondary aluminum ash was mixed with a 10 g/L sodium hydroxide solution according to a weight ratio of 1:10, and a reaction was conducted at 80° C. for 8 h to obtain an intermediate system.

(4) Calcium hydroxide and sodium hydroxide were added to the intermediate system, a reaction was conducted at 190° C. and 0.5 MPa for 4 h, a resulting reaction system was subjected to SLS, and a resulting solid was washed to obtain a finished secondary aluminum ash product for concrete.

An amount of the calcium hydroxide was 20 wt % of an amount of the deoxidized secondary aluminum ash and an amount of the sodium hydroxide was 2 wt % of the amount of the deoxidized secondary aluminum ash.

Comparative Example 2

Concrete was provided in this comparative example, which was different from Test Example 1 in that a different treatment process was adopted for secondary aluminum ash, specifically including:

(1) The secondary aluminum ash was ground to obtain ground secondary aluminum ash that had a sieve residue of 20.2 wt % when sieved through a 45 μm sieve.

Specifically, the secondary aluminum ash was added to a ball mill and ground without the addition of a grinding aid to obtain ground secondary aluminum ash, which had D90 of 63.54 μm, D50 of 38.55 μm, D10 of 15.66 μm, and a sieve residue of 20.2 wt % when sieved through a 45 μm sieve.

(2) The secondary aluminum ash was subjected to deoxidation.

Specifically, the ground secondary aluminum ash was placed in a reactor, and then nitrogen was introduced for replacement.

(3) The deoxidized secondary aluminum ash was mixed with a 100 g/L sodium hydroxide solution according to a weight ratio of 1:8, a reaction was conducted at 190° C. and 0.5 MPa for 8 h, a resulting reaction system was subjected to SLS, and a resulting solid was washed to obtain a finished secondary aluminum ash product for concrete.

The concrete obtained in each of Test Examples 1 and 2 and Comparative Examples 1 and 2 was tested, and specific test methods were as follows:

(1) Compressive strength (7 d, 28 d): It was determined in accordance with GB/T 50081-2019 *"Standards for Test Methods of Mechanical Properties of Ordinary Concrete"*.

(2) Chloride ion content: It was determined in accordance with JGJ/T 322-2013 *"Technical Regulations for Detection of Chloride Ion Content in Concrete"*.

(3) Concrete shrinkage: It was determined with reference to the non-contact method in GB/T 50082-2009 *"Standards for Test Methods of Long-Term Performance and Durability of Ordinary Concrete"*.

Specific test results were as follows:

(3) mixing deoxidized secondary aluminum ash with an alkali liquor according to a weight ratio of 1: (3-10), and reacting at 80° C. to 100° C. for 3 h to 10 h to obtain an intermediate system; and (4) adding calcium hydroxide and sodium hydroxide to the intermediate system, reacting a resulting system at 100° C. to 200° C. and 0.1 MPa to 1.55 MPa for 2 h to 4 h, conducting solid-liquid separation (SLS), and washing a resulting solid to obtain the finished secondary aluminum ash product for concrete, wherein in step (4), an amount of the calcium hydroxide added is 2 wt % to 20 wt % of an amount of the deoxidized secondary aluminum ash and an amount of the sodium hydroxide added is 1 wt % to 5 wt % of the amount of the deoxidized secondary aluminum ash.

2. The treatment method of secondary aluminum ash for concrete according to claim 1, wherein in step (1), the ground secondary aluminum ash has particle size distribution parameters satisfying the following condition: (D90−D10)/(D50−D10)≤2.

3. The treatment method of secondary aluminum ash for concrete according to claim 2, wherein step (2) comprises: mixing the ground secondary aluminum ash with water according to a weight ratio of 1: (2-10), stirring a resulting mixture at 60° C. to 90° C. to allow a reaction for 1 min to 30 min, and conducting SLS to obtain the deoxidized secondary aluminum ash.

4. The treatment method of secondary aluminum ash for concrete according to claim 3, wherein in step (2), a weight ratio of the ground secondary aluminum ash to the water is 1:(3-6), and the reaction is conducted at 80° C. to 90° C. for 10 min to 20 min.

5. The treatment method of secondary aluminum ash for concrete according to claim 4, wherein in step (2), an

| Performance indexes | | Test Example 1 | | | | | Test Example 2 | | | | Comparative Example 1 | Comparative Example 2 |
|---|---|---|---|---|---|---|---|---|---|---|---|---|
| | | Example 1 | Example 2 | Example 3 | Example 4 | Example 5 | Example 1 | Example 2 | Example 3 | Example 4 | Example 5 | | |
| 7 d Strength (MPa) | | 26.3 | 26.8 | 27.4 | 28.1 | 29.7 | 24.2 | 24.8 | 25.3 | 26.3 | 27.2 | 22.5 | 20.7 |
| 28 d Strength (MPa) | | 38.5 | 39.2 | 41.3 | 42.4 | 44.8 | 35.2 | 35.3 | 35.9 | 36.4 | 38.2 | 31.2 | 301 |
| Chloride content (%) | | 0.05 | 0.05 | 0.04 | 0.03 | 0.03 | 0.04 | 0.05 | 0.04 | 0.03 | 0.03 | 0.05 | 0.04 |
| Shrinkage ($10^{-6}$) | 1 d | 224 | 263 | 312 | 287 | 259 | 187 | 164 | 173 | 205 | 194 | 102 | 45 |
| | 3 d | 438 | 427 | 486 | 463 | 463 | 327 | 319 | 338 | 358 | 246 | 257 | A specimen collapses due to expansion. |
| | 28 d | 551 | 527 | 539 | 538 | 535 | 428 | 402 | 427 | 437 | 454 | 385 | |
| | 90 d | 582 | 558 | 572 | 578 | 563 | 483 | 428 | 476 | 482 | 468 | 412 | |

The above are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

The invention claimed is:

1. A treatment method of secondary aluminum ash for concrete, comprising the following steps:

(1) grinding the secondary aluminum ash to obtain ground secondary aluminum ash that has a sieve residue of lower than or equal to 30 wt % when sieved through a 45 μm sieve;

(2) subjecting the ground secondary aluminum ash to deoxidation;

ultrasonic transducer is provided in a device for the reaction to subject the ground secondary aluminum ash and the water to an ultrasonic treatment.

6. The treatment method of secondary aluminum ash for concrete according to claim 1, wherein in step (1), a grinding aid is added at an amount 0.01 wt % to 0.1 wt % of a weight of the secondary aluminum ash; and the grinding aid comprises the following components in weight percentage: ethylene glycol (EG): 20% to 30%, sodium stearate: 10% to 20%, diethylene glycol (DEG): 10% to 50%, and water: 10% to 60%.

7. The treatment method of secondary aluminum ash for concrete according to claim 1, wherein in step (3), the alkali liquor is a sodium hydroxide aqueous solution with a concentration of 1 g/L to 50 g/L.

8. The treatment method of secondary aluminum ash for concrete according to claim 1, wherein in step (4), the amount of the calcium hydroxide added is 12 wt % to 20 wt % of the amount of the deoxidized secondary aluminum ash, and the reacting of the system is conducted at 150° C. to 200° C. and 1 MPa to 1.2 MPa for 2.5 h to 3.5 h.

9. Secondary aluminum ash for concrete obtained by the treatment method according to claim 1.

10. Concrete comprising the secondary aluminum ash according to claim 9 in a content of 5 wt % to 20 wt %.

* * * * *